Jan. 15, 1929.  
B. F. P. POORE  
1,699,017  
APPARATUS FOR MOLDING BUILDING BLOCKS  
Filed May 23, 1927  
7 Sheets-Sheet 2

Inventor  
B.F.P.Poore,  
By  
Attorney

Jan. 15, 1929.

B. F. P. POORE 1,699,017

APPARATUS FOR MOLDING BUILDING BLOCKS

Filed May 23, 1927 7 Sheets-Sheet 3

Inventor
B.F.P.Poore,

By

Attorney

Jan. 15, 1929.

B. F. P. POORE 1,699,017

APPARATUS FOR MOLDING BUILDING BLOCKS

Filed May 23, 1927 7 Sheets-Sheet 5

Inventor

*B.F.P.Poore*,

By

Attorney

Patented Jan. 15, 1929.

1,699,017

UNITED STATES PATENT OFFICE.

BENJAMIN F. P. POORE, OF GREENVILLE, MISSISSIPPI.

APPARATUS FOR MOLDING BUILDING BLOCKS.

Application filed May 23, 1927. Serial No. 193,663.

The invention relates to an apparatus for molding building blocks.

The object of the present invention is to improve the construction of apparatus for molding building blocks of concrete or other plastic material and to provide a simple, practical and efficient molding apparatus of strong, durable and comparatively inexpensive construction adapted for molding a relatively large number of building blocks simultaneously and capable of effecting a great saving in time in the molding and handling of the molded blocks and of effecting a material reduction in the number of men required for such operation.

A further object of the invention is to provide a molding apparatus of this character adapted for molding by the wet process hollow or solid blocks of various sizes and arranged to permit the concrete or other plastic material to be readily supplied to the molds and after the filling of the latter to permit any surplus material to be conveniently handled and supplied to the molds for the next batch of building blocks.

Another object of the invention is to provide a molding apparatus adapted after the building blocks have been molded to enable the cores to be readily withdrawn and the pallets carrying the molded blocks to be readily removed from the molds and deposited on the car for conveying the molded blocks away from the molding mechanism to a kiln, platform or any other place without manually handling the molded blocks until the same are removed from the car for chemical treatment, kiln drying, or the like.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims may be resorted to without departing from the spirit of the invention or sacrificing any of the advantages thereof.

Figure 4:
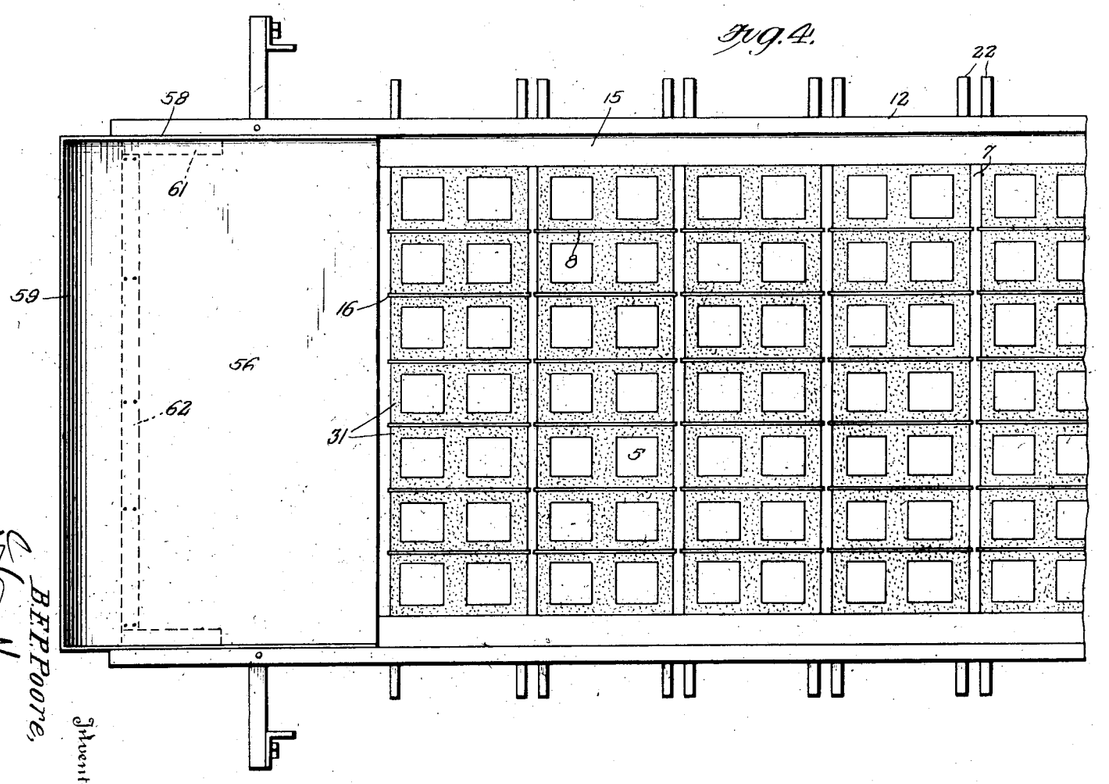
Fig. 4 is a plan view of the front end of the apparatus.
Figure 5:
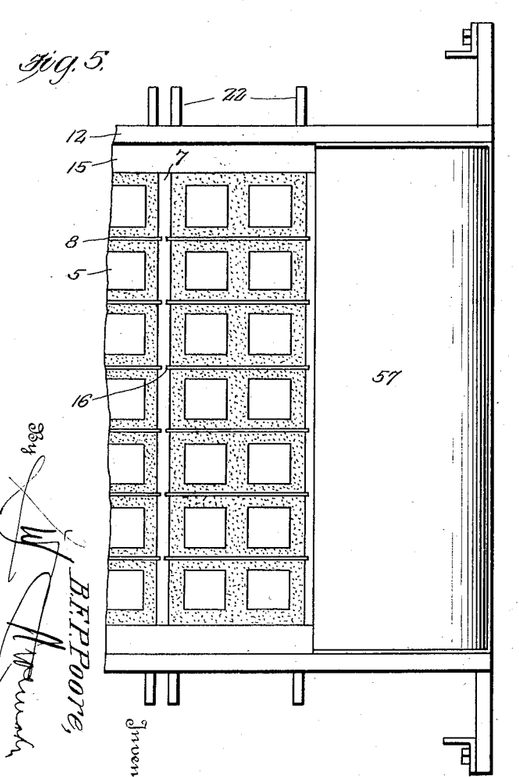
Fig. 5 is a plan view of the rear end of the apparatus.
Figure 12:
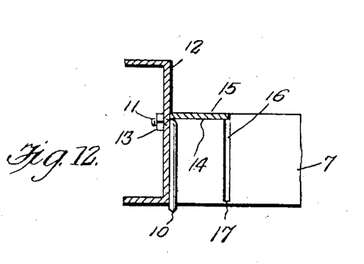
Fig. 12 is a detail sectional view taken substantially on the line 12—12 of Fig. 2.
Figure 13:
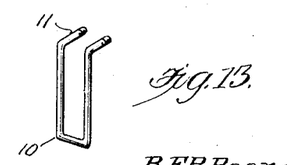
Fig. 13 is a detail persepective view of one of the stirrups which form hangers for the division bars.

In the accompanying drawings in which is illustrated the preferred embodiment of the invention the building block molding apparatus comprises in its construction a main frame or framework 1 designed to be constructed of angle iron, channel iron and similar flanged metal, but any other suitable material may of course be employed in the construction of the main frame as will be readily understood. The main frame is mounted upon a foundation 2 of concrete or other suitable material forming side and end walls around an enclosed pit 3 for the reception of a vertically movable carriage 4 which is raised and lowered by the mechanism hereinafter described for carrying core blocks 5 to and from a mold box 6 mounted upon the main frame at the top thereof. The walls of the pit formed by the foundation 2 are preferably inverted L-shaped in cross section, but they may be solid if desired or of uniform cross sectional area and a suitable platform or floor 3ª is preferably provided at the bottom of the pit. This floor or platform is shown arranged upon suitable sleepers or sills 4ª but it may be of any desired construction. The mold box is composed of transversely disposed division bars 7 and longitudinally disposed division plates 8 arranged at right angles to the division bars and dividing the spaces between the division bars into individual molds. The mold box is divided by the transversely disposed division bars and the division plates into transverse sets or series of individual molds as clearly illustrated in Figs. 4 and 5 of the accompanying drawings and transversely disposed pallets 9 are arranged beneath the transverse series of individual molds and extend entirely across the mold box. The ends of the transversely disposed division bars 7 are removably supported in hangers 10 consisting of stirrups of approximately U-shape having angularly bent terminals 11 which pierce longitudinal frame members 12 and are threaded for the reception of nuts 13 as clearly illustrated in Fig. 12 of the drawings. The stirrups consist of spaced vertical parallel sides and a connecting bottom portion and the upper ends of the sides are bent to form the horizontally disposed terminals 11. The stirrups form hangers open at the top to permit the division bars to be readily placed in and removed from the stirrups and the said division bars are provided at their upper edges with terminal recesses 14 for the reception of flat horizontally disposed plates 15 which close the spaces at the sides of the mold box between the frame members 12 and the end division plates. The frame members 12 are constructed of channel metal and the division bars 7 which form end walls of the individual molds are provided at intervals in their side faces with vertically disposed grooves 16 terminating short of the lower edges of the division bars to form supporting end walls 17 for supporting the division plates 8 which are removably arranged in the vertical grooves 16. By this construction the horizontal side plates 15 and the division bars and division plates may be readily removed to permit other division bars and plates to be substituted for them when it is desired to change the size of the individual molds. Any desired number of perforations may be provided for the stirrups 10 to permit an adjustment of the same should it be desired to vary the length of the building blocks. When it is desired to vary only the width of the building blocks the stirrups do not have to be changed but other division bars will be substituted for those illustrated in the drawings having grooves arranged at different points from the grooves illustrated in the drawings. This will permit the division plates to be arranged at different points from those shown in the drawings to vary the width of the building blocks. The mold box may, of course, be constructed of any desired dimensions and it will be clear that a large number of individual molds is provided for the simultaneous molding of a large number of building blocks.

Figure 8:
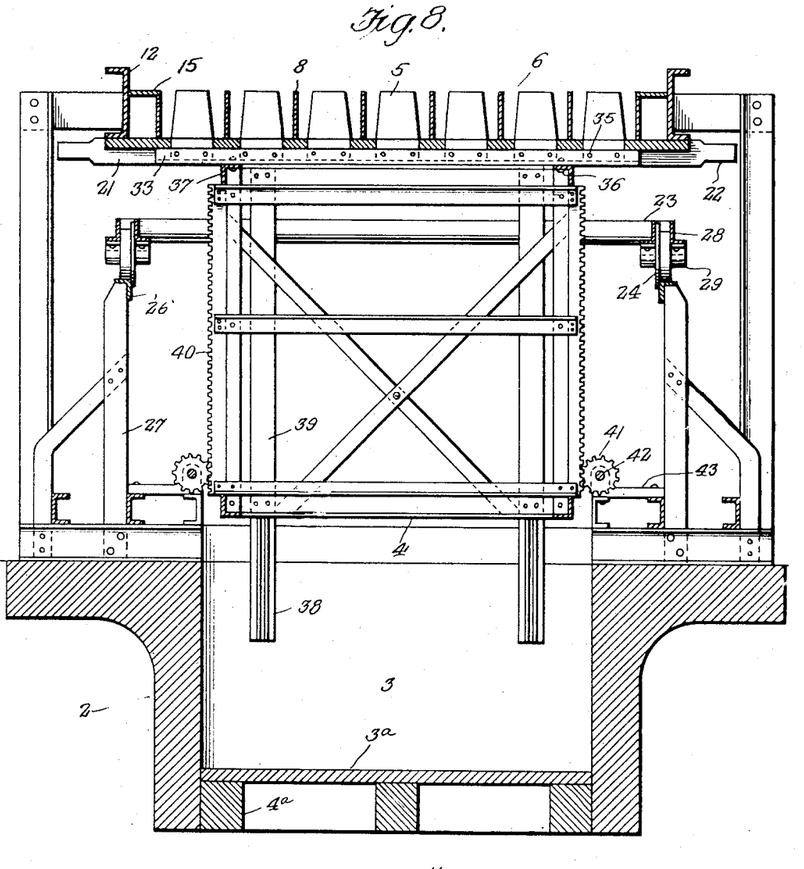
Fig. 8 is a transverse sectional view taken substantially on the line 8—8 of Fig. 1.
Figure 9:
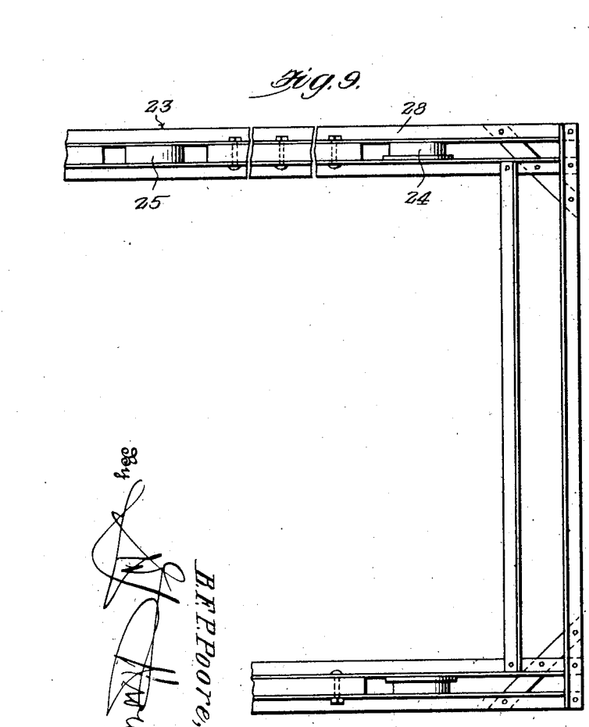
Fig. 9 is a plan view of one end of the car.
Figure 10:
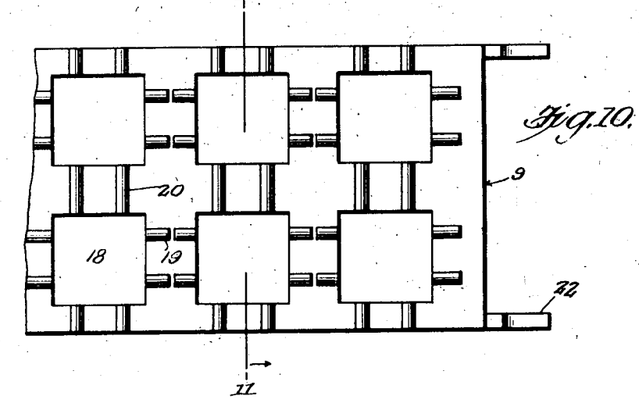
Fig. 10 is a plan view of a portion of the pallet.
Figure 11:
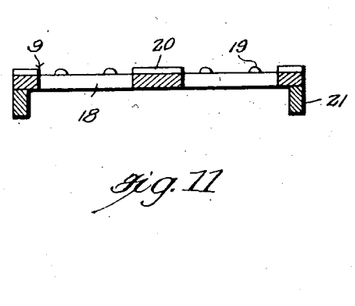
Fig. 11 is a detail sectional view on the line 11—11 of Fig. 10.

The pallets 9 which are oblong and which may be constructed of any suitable material, are when the building blocks are to be made hollow as illustrated in the accompanying drawings, provided with spaced openings 18 for the passage of the core blocks 5. The pallets are provided at intervals with pairs of openings when the building blocks are to be molded with two openings but one or more openings may of course be provided as will be readily understood and the pallets are provided at their upper faces with ribs 19 and 20 arranged at right angles to each other as clearly illustrated in Figure 10 of the drawings and adapted to form grooves in the lower edges of the building blocks. The pallets are provided at their sides with longitudinal bars 21 having extended terminals 22 forming handles for enabling the pallets to be conveniently carried and placed in position and removed from a car 23. The projecting terminals 22 of the side bars 21 are preferably shaped to form handles as clearly shown in Figure 8 of the drawings. The car comprises in its construction an open rectangular frame mounted on end and intermediate wheels 24 and 25 and defining an opening of sufficient size to permit the vertically movable carriage to pass through the car as clearly illustrated in Figure 8 of the drawings to lift the pallets from the car and elevate the same to form the bottom of the mold box and when the carriage is at the limit of its upward movement as illustrated in Figure 8 the pallets are clamped tightly against the bottom flanges of the channel members 12. When the carriage is moved downwardly the pallets are lowered from the mold box and are deposited upon and are supported by the frame of the car and the further downward movement of the carriage withdraws the core blocks from the openings formed in the molded material and also from the openings in the pallets and lowers the core blocks clear of the car to enable the car to be moved along a track to carry the molded building blocks away from the mold box to the desired point for further treatment. As the wet process is used in the molding of the building blocks, the hollow building blocks may be readily withdrawn from the individual molds and the core blocks may be easily withdrawn from the openings in the building blocks. The track is formed by spaced rails 26 preferably consisting of angle bars supported by suitable posts 27. Any suitable means may of course be provided for supporting the track at the desired elevation and in addition to the supporting posts of the track the ends of the rails are suitably secured to the frame work at the ends thereof. The end wheels 24 of the car are flanged as shown and the intermediate wheels 25 have flat treads.

The wheels of the car are journaled in suitable bearings and the frame of the car is preferably constructed of angle iron as shown, and the sides of the frame are preferably formed of spaced angle iron bars 28 spaced apart a sufficient distance to receive the upper portions of the wheels, the bearings 29 being secured to the bottom flanges of the spaced angle bars 28. Any other suitable construction of frame for the car may of course be employed.

Figure 1:
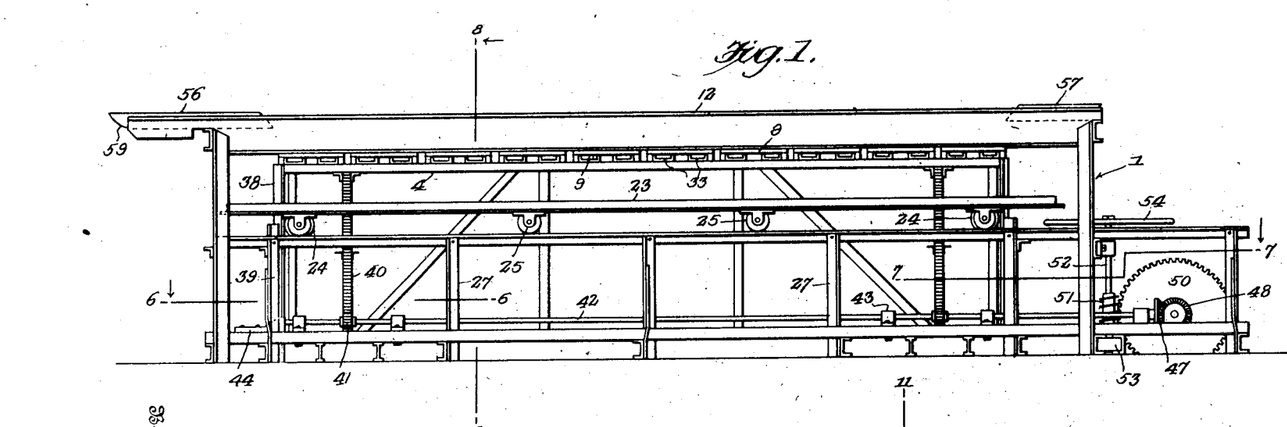
Figure 1 is a side elevation of a molding apparatus constructed in accordance with this invention.
Figure 2:
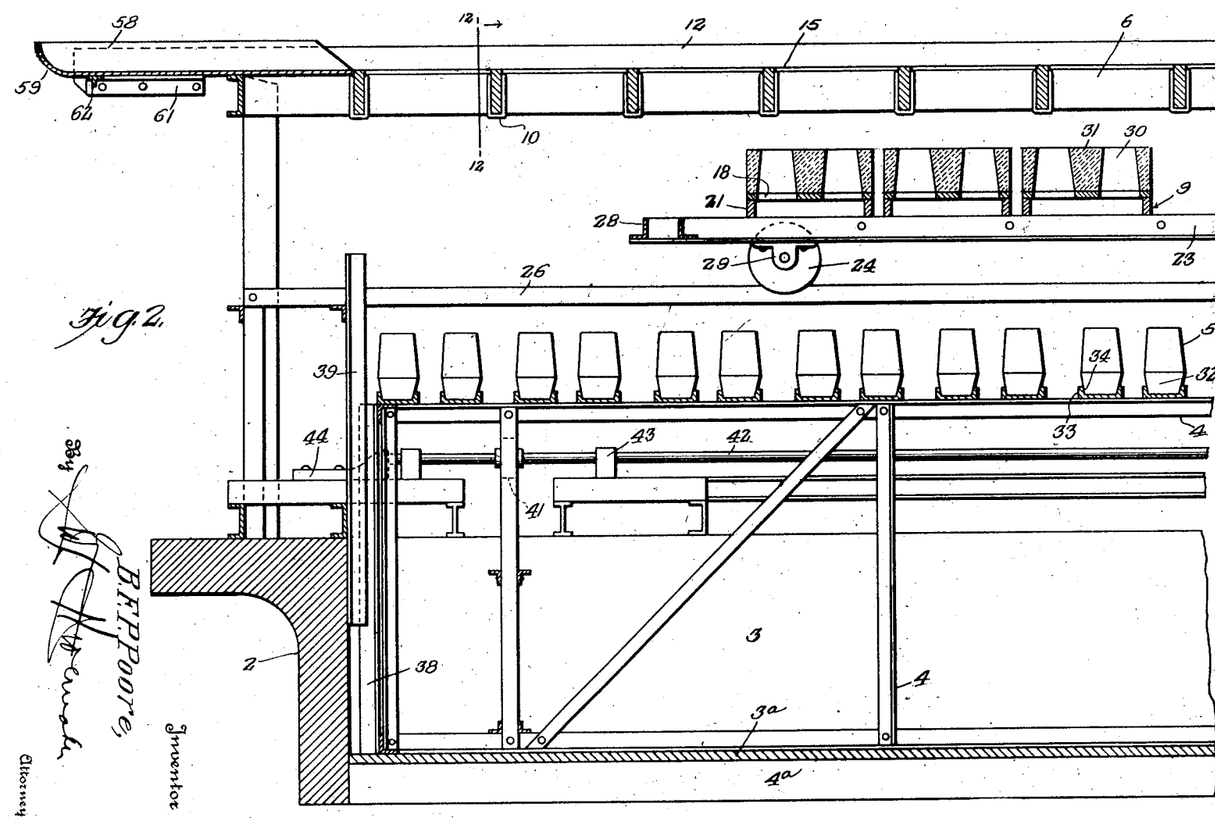
Fig. 2 is a longitudinal sectional view of the front end of the molding apparatus.
Figure 3:
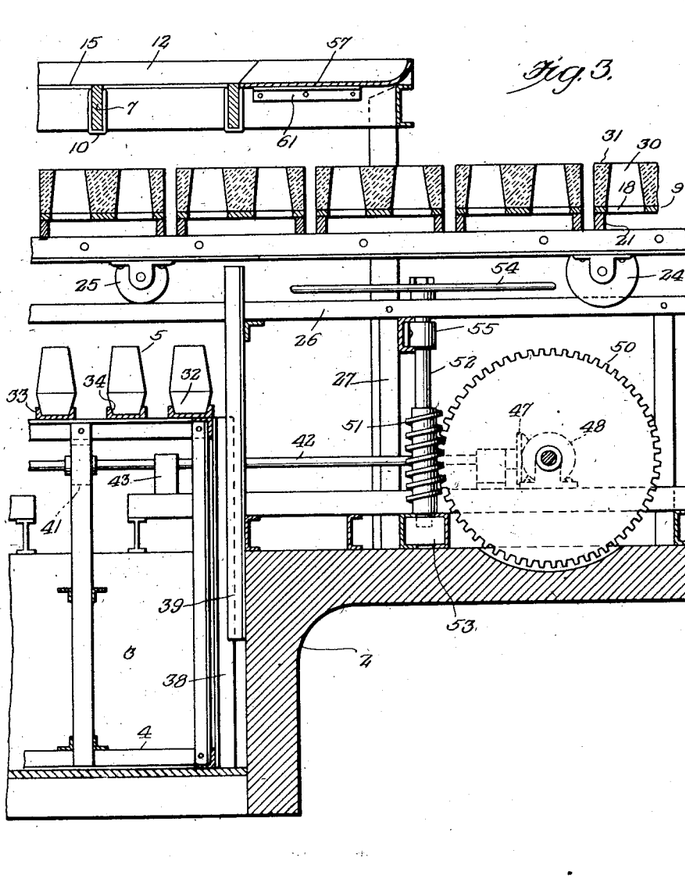
Fig. 3 is a similar view of the rear end of the apparatus.

The core blocks which are arranged vertically are preferably provided with tapered upper and lower portions as clearly illustrated in Figure 2 of the drawings. The upper tapered portions of the core blocks extend into the mold blocks and project from the upper face of the pallet and form the tapered openings 30 in the hollow building blocks 31. The lower tapered portions 32 of the core blocks fit in channel yoke bars 33 extending across the vertically movable carriage and arranged at regular intervals and composed of a horizontal bottom portion and side flanges which have inclined inner faces 34 to fit the lower tapered portions of the core blocks. The core blocks fit flat against the bottom of the bars 33 and are secured in firm engagement with the same by means of horizontal fastening devices 35, arranged in pairs and piercing the side flanges of the channel bars and the lower tapered portions of the core blocks. These fastening devices are designed to be removable to enable the core blocks to be removed and replaced when desired. The horizontal transversely disposed core block supporting bars are designed to be detachably secured to the carriage by suitable fastening devices 36 to enable other channel bars to be substituted for those illustrated in the accompanying drawings when it is desired to provide for molding hollow building blocks of different dimensions and with differently arranged openings from those illustrated in the accompanying drawings. If desired, the core block supporting yoke bars may be provided with perforations arranged at intervals to permit an adjustment of the core blocks so that the number of core blocks for each channel bar may be varied. The core block supporting bars are arranged upon angle bars 37 and the fastening devices 36 pass through horizontal flanges of the angle bars 37 which are arranged to dispose the horizontal flanges at the top as clearly shown in Figure 8 of the drawings. The vertically movable carriage consists of a suitable framework of flanged and flat bars but angle bars and channel bars of any size of the required strength may be employed in the construction of the vertically movable carriage which preferably consists of a skeleton frame work as shown. The vertically movable carriage is provided at its ends with vertically disposed slides 38 formed by T-bars which are composed of laterally extending attaching flanges and a projecting flange which slides between a guide formed by spaced angle irons 39 composed of attaching flanges and guiding flanges. The guide bars 39 are suitably secured to the main frame work at the ends thereof and the vertically movable carriage is guided by the said angle bars 39 which receive in the spaces between them the projecting flanges of the slide bars 38. These vertical guides prevent lateral movement of the carriage and relieve the raising and lowering mechanism of lateral strain. Any other suitable guiding means may of course be employed and any friction bearings may be used if desired.

Figure 6:
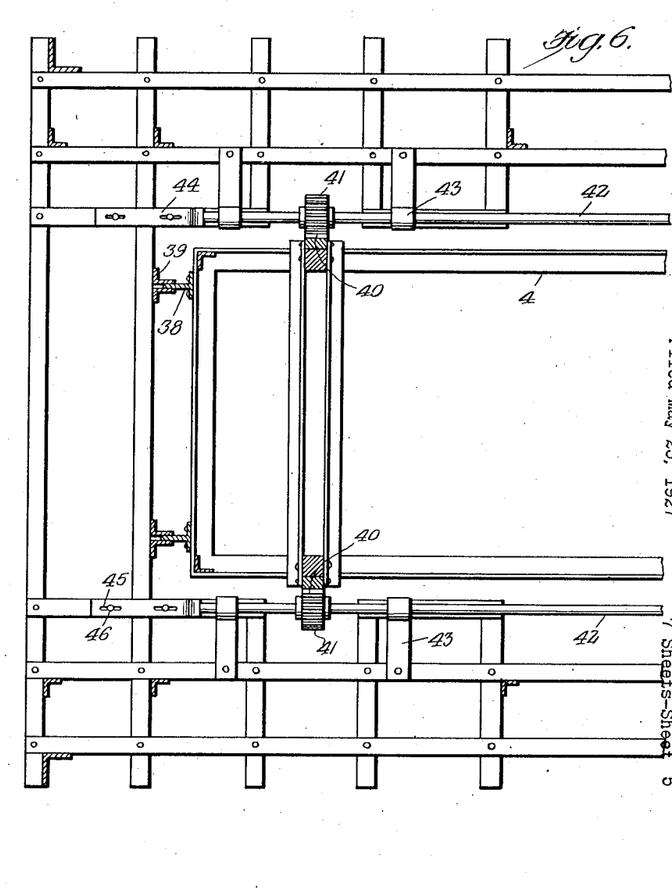
Fig. 6 is a horizontal sectional view taken substantially on the line 6—6 of Fig. 1 showing the front end of the apparatus.
Figure 7:
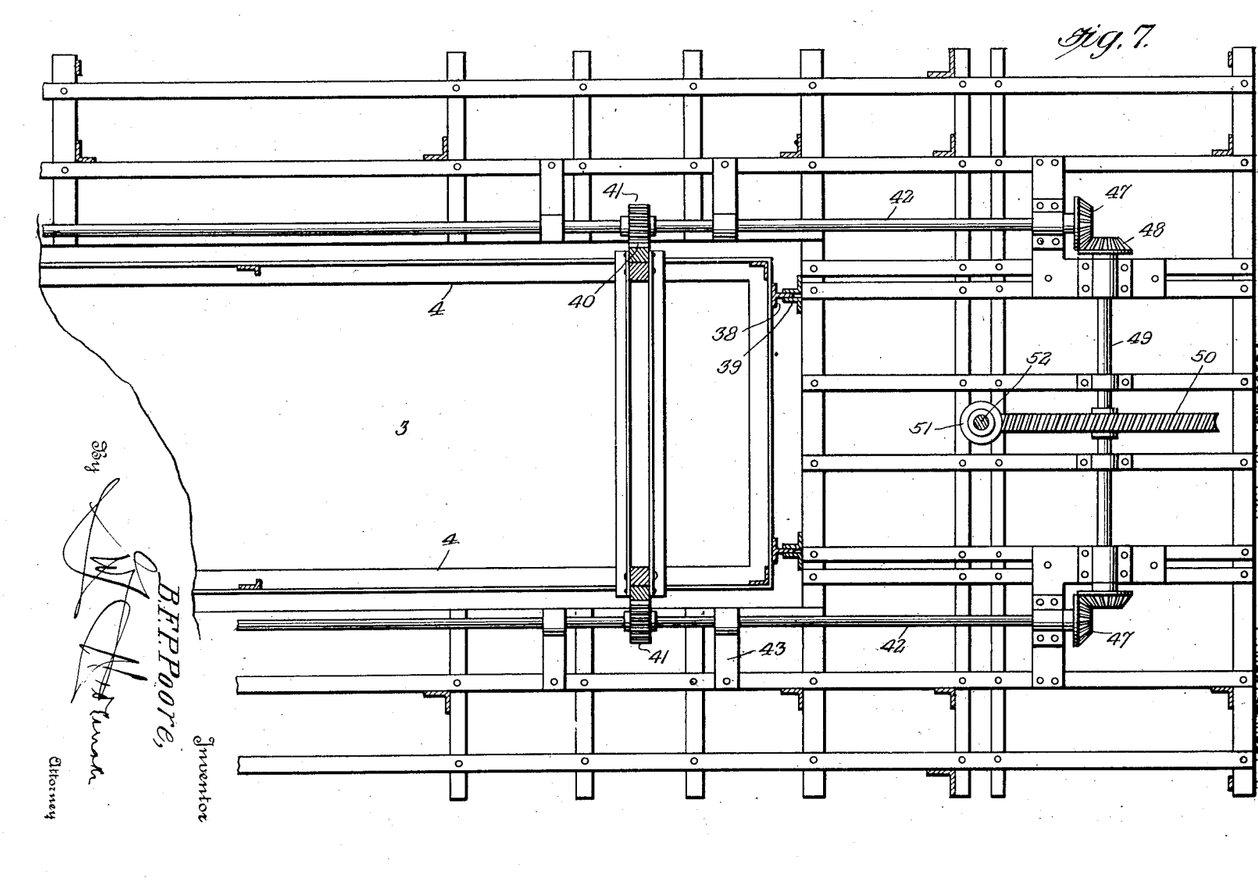
Fig. 7 is a horizontal sectional view on the line 7—7 of Fig. 1 illustrating the rear end of the apparatus.

The vertically movable carriage which is of a length and width to pass through the opening of the car frame is raised and lowered by mechanism comprising vertically disposed rack bars 40 arranged in pairs at the end portions of the carriage and located at the sides thereof and having their teeth at their outer faces to mesh with pinions 41 of longitudinally disposed line shafts 42 journaled in suitable bearings 43 of the main frame and having their front ends engaged by adjustable thrust bearings 44 mounted on the main frame and provided with slots 45 and suitable fastening devices 46 for securing the thrust bearings in their adjustment. The rack bars are arranged between the opposite spur pinions 41 which may be fixed to the longitudinally disposed shafts 42 by any suitable means. The carriage is provided between the spaced rack bars with suitable bracing means which securely holds the rack bars against inward movement as clearly illustrated in Figures 6 and 7 of the drawings. The rear ends of the longitudinal shafts 42 are provided with bevel gears 47 which mesh with beveled gears 48 suitably fixed to the ends of a transverse drive shaft 49 journaled in suitable bearings of the main frame and having mounted on it a worm wheel 50 which is engaged by a worm 51 of a vertically disposed operating shaft 52. The operating shaft 52 is stepped at its lower end in a suitable bearing 53 and is provided at its upper end with a relatively large hand wheel 54. The shaft 52 is also journaled at its upper portion in a suitable bearing 55 but the shaft may be mounted in any other desired manner and the hand wheel of the operating shaft is centrally arranged and the worm 51 is disposed so that by rotating the hand wheel 54 in a clockwise direction the vertically movable carriage will be raised and a reverse rotation of the hand wheel will lower the carriage. By means of the worm gearing one man may readily operate the hand wheel for raising and lowering the carriage and it will be noted that the carriage is raised in an empty condition so that comparatively little force is required for this purpose and the weight of the molded material will assist the downward movement of the carriage until the pallets rest upon the car when comparatively little force will be required to lower the core blocks and arrange the carriage out of the way of the car temporarily to transmit the molded building blocks from the molding mechanism for further treatment of the blocks.

The frame members 12 extend above the mold box and the machine is equipped at its ends with adjustable trays 56 and 57 constructed of suitable metal and composed of a horizontal bottom portion provided with side walls 58 and having upwardly curved outer end walls 59. These trays are adapted to receive the concrete or other plastic material which is spread over the mold box until the same is filled and horizontal side plates form guides for enabling the material to be properly smoothed off and the excessive material removed from the mold box into the trays which are adjustable to arrange them in proper position with relation to the mold box. The adjustment of the trays will admit of the use of the mold boxes to different lengths and the said trays are adapted to receive and hold any excess material which may readily be delivered from the trays into the mold box for making the next batch of building blocks. When a batch of building blocks is molded and the material set sufficient, the raising and lowering mechanism is operated to lower the carriage with the pallets and the molded building blocks thereon. This downward movement of the carriage will deposit the pallets upon the frame of the car after which the core blocks are removed from the openings of the molded material by a further downward movement of the carriage which is carried clear of the car so that the latter may be run along a track to the place where the molded building blocks are to be taken from the car. The frame work is provided with suitable means for supporting and guiding the trays, the supporting means preferably consisting of angle bars 60 and 61 secured to the frame work and each having one of its flanges arranged horizontally to the supporting trays. The front tray is preferably of greater size than the rear tray as it is designed to receive the plastic material to be molded into building blocks and it may be reinforced by a T-bar 62 or other suitable means. The T-bar 62 which is secured to the lower face of the front tray is arranged to slide between the angle bars 61 as clearly indicated in Figure 2 of the drawings.

When it is desired to mold solid building blocks the core blocks will of course be omitted together with the openings in the pallets. The worm gear besides enabling one man to readily raise and lower the carriage also forms a lock for clamping the pallets against the open bottom of the mold box between the latter and the carriage.

What is claimed is:

1. A molding apparatus including a main frame having a mold box open at the bottom, a car movable along the main frame and having an opening, a vertically movable carriage mounted in the main frame and movable through the opening in the car and adapted to be arranged below the car clear of the same, and a pallet forming a bottom for the mold box and arranged to be raised and lowered by the carriage and being of a length to rest upon and be carried by the car.

2. A molding apparatus comprising a main frame having a mold box open at the bottom, a vertically movable carriage, a plurality of pallets supported by the carriage and forming a bottom for the mold box, and a car arranged to run on the main frame and surrounding the carriage and forming an opening of a size to permit the carriage to pass through it, said pallets being extended beyond the carriage and arranged to be supported by the car when the carriage is lowered and means for raising and lowering the carriage and for holding the same in an elevated position with the pallets clamped between the carriage and the mold box.

3. A molding apparatus including a frame work having a mold box, a vertically movable carriage, a pallet mounted on the carriage and forming a bottom for the mold box and held in position by the said carriage, rails located at opposite sides of the carriage and located beyond the same and a car surrounding the carriage and having an opening through which the carriage passes, said car being arranged upon said rails and the pallet being of sufficient size to be supported by the car when the carriage is lowered.

4. A molding apparatus including a main frame, provided with a mold box open at the bottom, a pallet forming a bottom for the mold box and having openings, a vertically movable carriage supporting the pallet and having core blocks extending through the openings of the same into the mold box for molding hollow blocks, rails located at opposite sides of the carriage and spaced therefrom, a car arranged upon the rails and having an opening of sufficient size to permit the carriage and the core blocks to pass through it, the pallet being of sufficient size to project beyond the carriage and rest upon the car when the carriage is lowered, whereby the downward movement of the carriage will withdraw the material from the mold box and the cores from the blocks and deposit the pallets with the material upon the car.

5. A molding apparatus including a main frame work having a mold box open at the bottom, a vertically movable carriage, a pallet supported by the carriage and forming a bottom for the mold box, a car having an opening of sufficient size to permit the carriage to pass through it and the pallet being of sufficient size to rest upon the car when the carriage is lowered, said car being movable along the main frame and mechanism for raising and lowering the carriage comprising vertical rack bars mounted on the carriage at opposite sides thereof, longitudinal shafts provided with pinions meshing with the rack bars, a centrally arranged worm gearing located between the shafts and operatively connected with the same for simultaneously rotating the same for raising and lowering the carriage and for locking the carriage in an elevated position with the pallet clamped beneath the mold box 6. A molding box apparatus including a main framework having a mold box open at the bottom, a vertically movable carriage, a pallet supported by the carriage and forming a bottom for the mold box a car having an opening of sufficient size to permit the carriage to pass through it and the pallet being of sufficient size to rest upon the car when the carriage is lowered, said car being movable along the main frame and mechanism for raising and lowering the carriage comprising vertical rack bars mounted on the carriage at opposite sides thereof, longitudinal shafts provided with pinions meshing with the rack bars, a transverse shaft extending across the space between the said shafts, gearing connecting the latter with the ends of the transverse shaft, a vertical worm wheel mounted on the transverse shaft centrally thereof, and a vertically disposed operating shaft having a worm meshing with the worm wheel, said operating shaft being also provided with operating means for rotating the worm.

7. A molding apparatus including a foundation having a pit, a main frame mounted on the foundation and having a mold box open at the bottom, a vertically movable carriage adapted to be lowered into the pit, a pallet forming a bottom for the mold box and supported by the carriage when the latter is elevated, a car movable along the main frame and having an opening of sufficient size to permit the carriage to pass through it and the pallet being of sufficient size to rest upon the car when the carriage is lowered, means arranged at the sides of the carriage for raising and lowering the same, and spaced vertically disposed guiding means located at the ends of the carriage for guiding the same in its vertical movement.

8. A molding apparatus including a foundation having a pit, a main frame mounted on the foundation and having a mold box open at the bottom, a vertically movable carriage adapted to be lowered into the pit, a pallet forming a bottom for the mold box and supported by the carriage when the latter is elevated, a car movable along the main frame and having an opening of sufficient size to permit the carriage to pass through it and the pallet being of sufficient size to rest upon the car when the carriage is lowered, means arranged at the sides of the carriage for raising and lowering the same, and spaced vertically disposed guiding means located at the ends of the carriage for guiding the same in its vertical movement, said guiding means comprising spaced angle bars forming guides, and bars secured to the carriage and having projecting flanges forming slides and operating in the spaces between the guide bars.

9. A molding apparatus including a main frame work having a mold box open at the bottom, a vertically movable carriage, a pallet supported by the carriage and forming a bottom for the mold box, a car having an opening of sufficient size to permit the carriage to pass through it and the pallet being of sufficient size to rest upon the car when the carriage is lowered, said car being movable along the main frame and mechanism for raising and lowering the carriage comprising vertical rack bars mounted on the carriage at opposite sides thereof, longitudinal shafts provided with pinions meshing with the rack bars, adjustable thrust bearings mounted on the main frame and receiving the front ends of the said shafts, a transverse shaft located at the rear ends of the said shafts and operatively connected with the same, and worm gearing located intermediate of the ends of the transverse shaft for rotating the same.

10. A molding apparatus including a main frame, a mold box mounted on the main frame and comprising spaced side members provided at intervals with hangers, transverse division bars removably mounted in the hangers and provided at opposite sides with vertical ways, division plates removably supported in the said ways and forming individual molds, and a pallet forming the bottom of the mold box.

11. A molding apparatus including a main frame having side members, stirrups mounted on the side members and open at the top and forming hangers, removable division bars mounted in the hangers and provided at opposite sides with ways, vertical division plates removably supported in the ways, and pallets forming a bottom for the mold box.

12. A molding apparatus including a main frame having side members, division bars extending across the space between the side members, and provided in their upper edges with terminal recesses, horizontal side plates removably arranged in the terminal recesses, and pallets forming a bottom for the mold box.

In testimony whereof I have hereunto set my hand.

BENJAMIN F. P. POORE.